(12) United States Patent
Taylor

(10) Patent No.: US 6,788,871 B2
(45) Date of Patent: Sep. 7, 2004

(54) OPTICAL FIBER CONNECTION HOUSING WITH AN OUTLET CONNECTOR ELEMENT AND A SPLICE CONNECTION TO AN OPTICAL LINE GROUP

(75) Inventor: Christoper Charles Taylor, Cheltenham (GB)

(73) Assignee: Krone GmbH, Berlin-Zehlendorf (DE)

(*) Notice: Subject to any disclaimer, the term of this patent is extended or adjusted under 35 U.S.C. 154(b) by 0 days.

(21) Appl. No.: 10/381,467

(22) PCT Filed: Sep. 24, 2001

(86) PCT No.: PCT/EP01/11019
§ 371 (c)(1),
(2), (4) Date: Mar. 25, 2003

(87) PCT Pub. No.: WO02/27883
PCT Pub. Date: Apr. 4, 2002

(65) Prior Publication Data
US 2004/0013389 A1 Jan. 22, 2004

(30) Foreign Application Priority Data
Sep. 27, 2000 (GB) .............................................. 0023667

(51) Int. Cl.⁷ ................................................. G02B 6/00
(52) U.S. Cl. ..................... 385/135; 385/136; 385/137
(58) Field of Search ............................... 385/135, 137, 385/136, 138, 139

(56) References Cited

U.S. PATENT DOCUMENTS

| | | |
|---|---|---|
| 5,661,841 A | 8/1997 | Van Noten |
| 5,668,911 A | 9/1997 | Debortoli |
| 5,754,724 A | 5/1998 | Peterson et al. |
| 5,781,686 A * | 7/1998 | Robinson et al. ........... 385/135 |
| 5,790,741 A | 8/1998 | Vincent et al. |
| 5,804,765 A | 9/1998 | Siemon et al. |
| 6,282,360 B1 * | 8/2001 | Milanowski et al. ....... 385/135 |

FOREIGN PATENT DOCUMENTS

| | | |
|---|---|---|
| EP | 0 583 541 A1 | 2/1994 |
| WO | WO 98/48308 | 10/1998 |

* cited by examiner

Primary Examiner—Chandrika Prasad
(74) Attorney, Agent, or Firm—Rader, Fishman & Grauer PLLC

(57) ABSTRACT

A housing is provided for a connection between optical fibers located in line groups (trunking or the like) in a building and one or more items of equipment. The housing is molded of plastic material and includes first and second housing members which are connectable. The first housing member is mountable on a wall or the like in the building so that it can receive optical fibers from the trunking and having formations which define a path for the fibers. The second housing member is pivotably mounted on the first member and has a shell. The shell has formations which define a path which can receive the fibers from the first housing member and along which the fibers can be guided to a splice region. The housing member has further formations which define paths for fibers extending from the splice region to one or more outlets.

24 Claims, 4 Drawing Sheets

OPTICAL FIBER CONNECTION HOUSING WITH AN OUTLET CONNECTOR ELEMENT AND A SPLICE CONNECTION TO AN OPTICAL LINE GROUP

FIELD OF THE INVENTION

This invention relates to a housing for use in providing a connection between optical fibers located in line groups (trunking) or in wall boxes or underfloor boxes in a building and one or more items of equipment located within that building.

BACKGROUND OF THE INVENTION

The use of optical fibers as the medium for carrying signals is becoming evermore widespread and it is now not uncommon for equipment used in a building to have an optical fiber by means of which it can be coupled to a wall outlet. Wall outlets for optical fibers need to be able to provide an interconnection between equipment such as that referred to above and optical fibers located in for example the trunking of the building. They also need to provide a facility which allows for the fact that sometimes re-termination of fibers within the outlet is necessary.

SUMMARY OF THE INVENTION

The present invention is concerned with a housing which is designed to meet such requirements.

According to the present invention there is provided a housing for use in providing a connection between optical fibers located in trunking or the like in a building and one or more items of equipment, said housing comprising first and second housing members which are connectable. The first housing member is mountable on a wall or the like in the building so that it can receive optical fibers from the trunking and having formations which define a path for the fibers. The second housing member has formations which define a path which can receive the fibers from the first housing member and along which the fibers can be guided to a splice region. The housing member has further formations which define paths for fibers extending from the splice region to one or more outlets.

The second housing member may comprise two parts, a first part being pivotally connected to a first housing member and being molded so as to define the one or more outlets, and the second part may include a tray-like member which has the formations which define the paths. The splice region can be defined in the tray-like member and can be arranged to receive one or more splice units. Each splice unit may comprise a molded member which defines a number of side-by-side channels. The splice region may also accommodate a breakout unit which, when used, is disposed below the splice unit or units.

The molded formations may define paths which are arranged to have a radius of curvature which is not less than a preselected critical radius. The paths may be so defined that the optical fibers can extend around them a plurality of times.

The formations provided on the first housing member may define a path whose shape enables the direction of the fibers to be changed without subjecting the fiber to bending of less than a critical bending radius.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
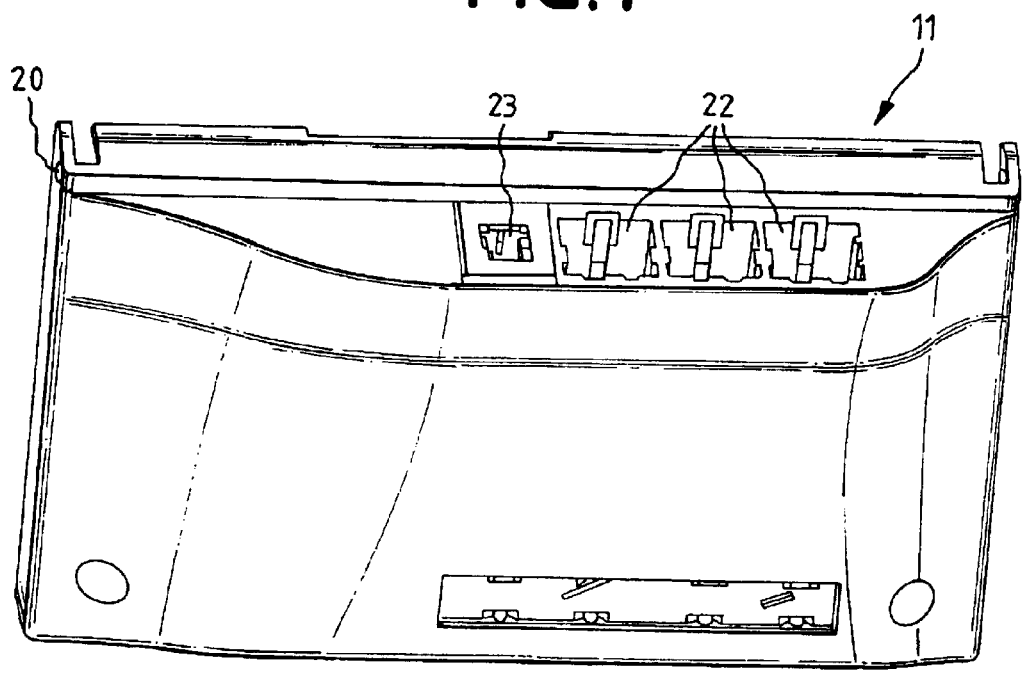
FIG. 1 is a perspective view of a wall outlet housing for optical fibers in accordance with an embodiment of the present invention.
Figure 2:
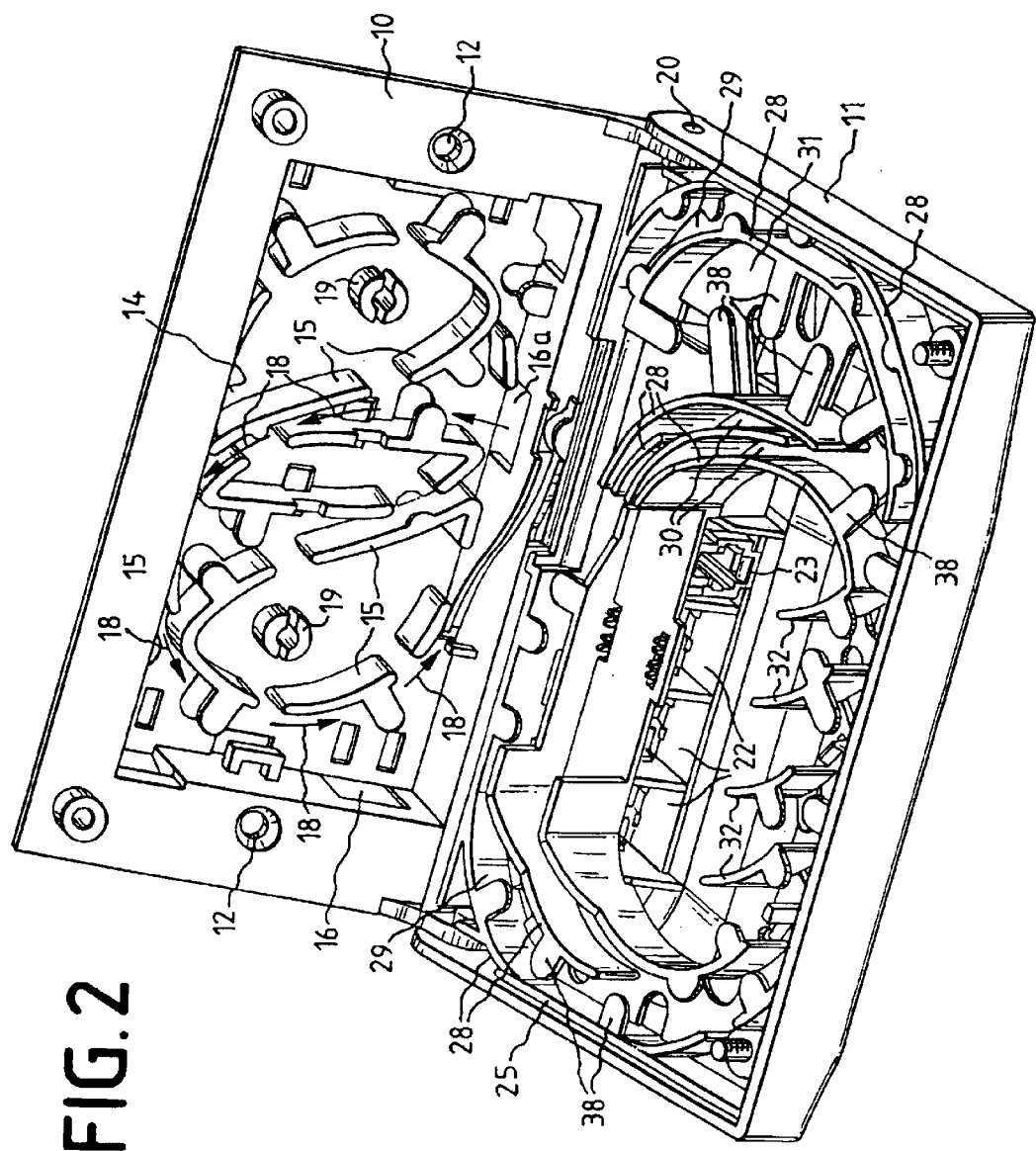
FIG. 2 is a perspective view showing the outlet housing in an open condition.
Figure 3:
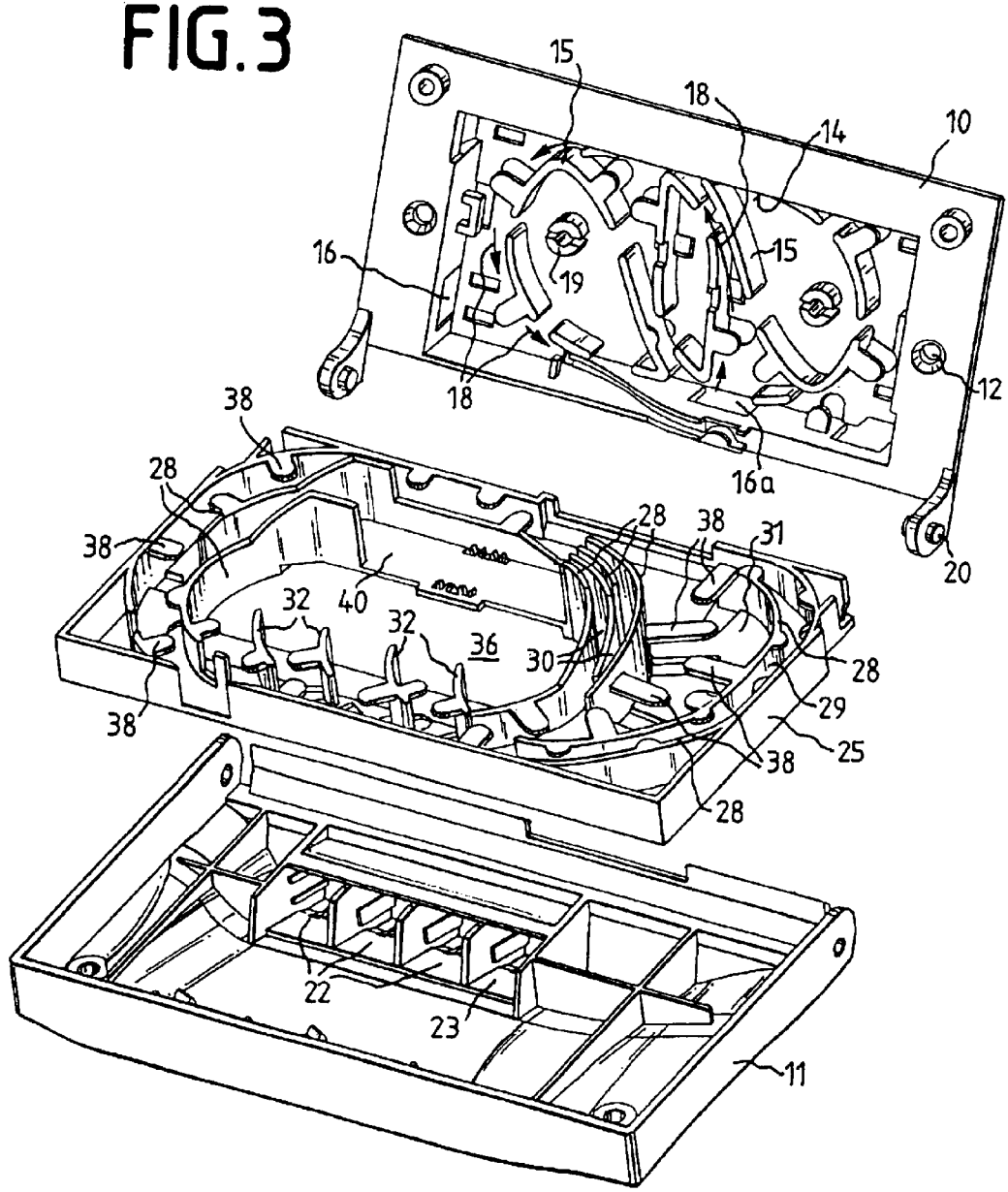
FIG. 3 is an exploded view of the outlet housing.

Referring to the drawings in particular, a housing for use as a wall outlet for optical fibers comprises first and second housing parts 10 and 11.

The housing part 10 is molded from plastics material and can be secured to a wall, such as an internal wall of a building, by means of screws extending through apertures 12. The housing part 10 is molded so that it has a recessed part 14 within which are formed a plurality of molded formations 15. A wall of the recess part 14 also includes one or more apertures 16, 16a. The formations 15 are designed to define paths along which optical fibers can extend, these paths allowing the direction of the fibers to change without subjecting them to bending of less than a critical bending radius. For example optical fibers entering from trunking through aperture 16a can pass along the path shown by reference numeral 18. The housing part 10 also includes two split annular formations 19 which act as restraint points for a kevlar member which can be used to secure an optical fiber cable.

The second housing part 11 is also molded from plastics material and has a hinged connection 20 to the first housing part so that the first and second housing parts can pivot one relative to the other. The second housing part 11 is molded to define a number of side-by-side outlets 22 and 23 which can receive optical fiber connector parts.

The second housing part 11 can receive a tray-like member 25 which sits within the second housing member 11 so that it is disposed above the outlets 22 and 23. The tray-like member 25 is molded from plastics material and includes a plurality of curved formations shown generally at 28. These formations 28 define a number of tracks along which optical fibers can extend. These include an outer track shown at 29, inner tracks 30 and an intermediate region 31. In addition formations 32 define pathways through which fibers can extend to the outlets 22 and 23. In this respect it should be noted that the central region 36 of the tray is open. The formations 28 and 32 include projecting fingers 38 which can act as retaining members for fibers disposed in tracks 29, 30.

Figure 4:
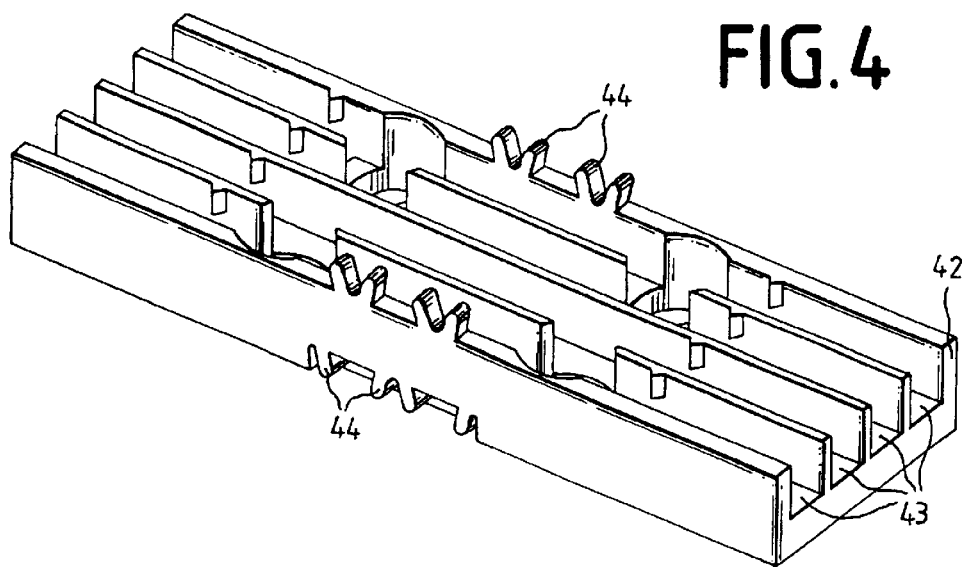
FIG. 4 is a perspective view of a splice unit.

The tray is also molded to define a shelf 40. The area above the shelf 40 constitutes a splice region which can receive one or more splice units 42 such as that shown in FIG. 4 of the drawings. This splice unit 42 is molded from plastics material and defines four side-by-side channels 43, each of which can accommodate an optical fiber.

The splice unit 42 also has formed thereon formations shown at 44 which constitute clip members. The lower clip members 44 can engage similar clip members formed on the shelf 40 to secure the splice unit in position on the shelf The upper clip units 44 can be engaged by another splice unit placed above the one shown in FIG. 4 to secure two such units relative to one another.

Figure 5:
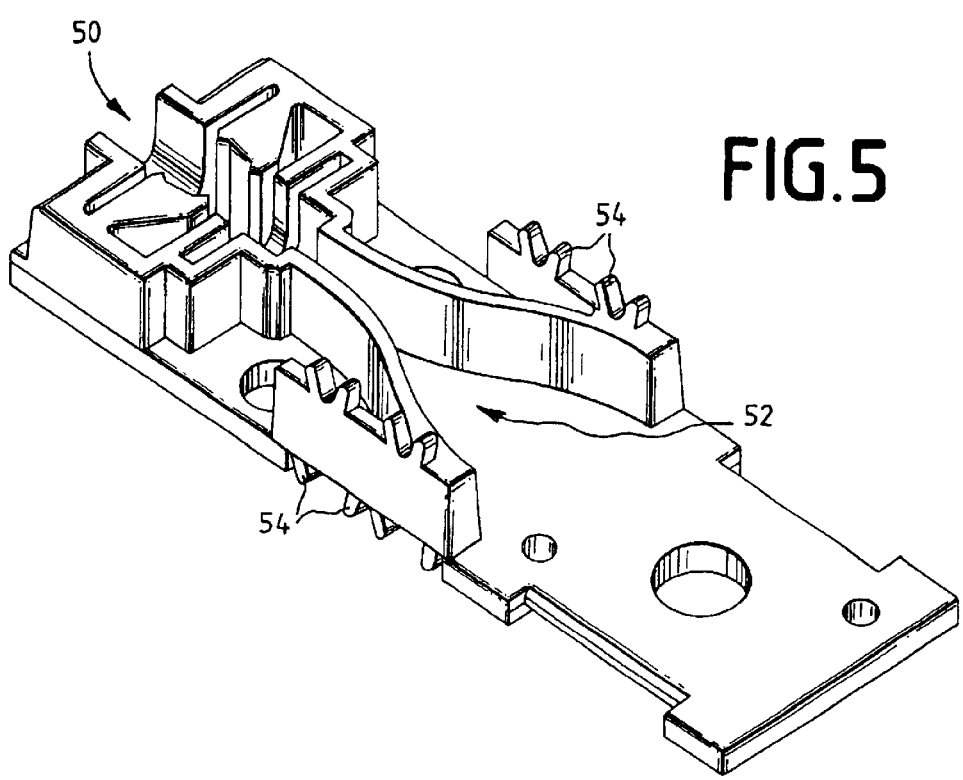
FIG. 5 is a perspective view of a breakout unit.

It is possible also optionally to locate what is known as a breakout unit in the splice region. A typical breakout unit is shown in FIG. 5 of the drawings and when used will be located beneath a splice unit such as 42, i.e. it will be directly mounted on the shelf 40. The breakout unit is a molded plastics element which defines a path for a group of optical fibers which has an inlet 50 and a diverging portion 52 at its opposite end which allow optical fibers to be spread out along a number of side-by-side channels. The breakout unit also has formations 54 whose function is the same as the formations 44 on the splice unit.

In use the wall outlet is secured to a wall by means of screws extending through the apertures 12. A length of optical fiber cabling or a bundle of optical fibers is fed in from trunking behind the wall through for example aperture 16a and around the path 18. These fibers are then fed into the tray section 25 so that they extend around the outer path 29 defined by the formations 28. These fibers can be fed a number of times around the tray, each time passing through the region 31. This in effect provides a degree of slack or excess length of fibers which is sufficient to enable re-termination should that be required in the future. Ultimately the fibers are fed into the splice region 40. If the breakout unit is employed the fibers are fed first into the breakout unit from where they emerge into the inner channels 30 and then pass around the inner path to a splice unit such as that shown in 42. The ends of these fibers are then spliced with further lengths of optical fiber, the splices being located one within each of the channels 43 of the splice unit 42. The additional fiber lengths are then fed into the channels 30 and can be themselves passed a number of times around the tray through the slack area 31 until ultimately passing along the outer path 29 and exiting through the outlet sections 32. These lengths of fiber have on their ends appropriate optical fiber connector elements which are secured within the outlets shown at 22 and 23.

These connector elements can receive mating connector elements provided on the ends of optical fibers extending from equipment within the building.

The formations 15 and 28 are all designed to define paths whose radius of curvature is not less than the critical radius of curvature to which an optical fiber should be subjected. A feature of the present wall outlet is the provision within the housing of a slack area (31) which can accommodate a significant length of optical fiber. The reason for this is that should re-termination and splicing of the fibers be necessary at some time in the future, this is possible since within the housing there is sufficient length of fiber accommodated to allow for such re-termination.

While specific embodiments of the invention have been shown and described in detail to illustrate the application of the principles of the invention, it will be understood that the invention may be embodied otherwise without departing from such principles.

What is claimed is:

1. A housing for use in providing a connection between optical fibers located in trunking or the like in a building and one or more items of equipment, the housing comprising: a first housing member; a second housing member, said first and second housing members being connectable, said first housing member being mountable on a wall or support surface in the building so as to receive optical fibers from said trunking and having formations which define a path for said fibers, said second housing member having a splice region and formations which define a path which can receive said fibers from said first housing member and guide the fibers to said splice region, said second housing member having further formations which define paths for fiber extending from said splice region to one or more outlets.

2. A housing according to claim 1, wherein said second housing member comprises two parts including a first part pivotally connected to said first housing member, said first part being molded so as to define said one or more outlets, and said second part including a tray member which has said formations which define said paths.

3. A housing according to claim 2, wherein the splice region is defined in said tray member and is arranged to receive one or more splice units.

4. A housing according to claim 3, wherein each splice unit comprises a molded member which defines a number of side-by-side channels.

5. A housing according to claim 3, wherein the splice region also accommodates a breakout unit which, when used, is disposed below the splice unit or units.

6. A housing according to claim 1, wherein the formations define paths which are arranged to have a radius of curvature which is not less than a preselected critical radius.

7. A housing according to claim 1, wherein the paths are so defined that the optical fibers can extend around them a plurality of times.

8. A housing according to claim 1, wherein the formations provided on the first housing member define a path whose shape enables the direction of the fibers to be changed without subjecting the fiber to bending of less than a critical bending radius.

9. A housing according to claim 4, wherein the splice region also accommodates a breakout unit which, when used, is disposed below the splice unit or units.

10. A housing providing a connection between optical fibers located in line groups and one or more devices, the housing comprising:

a first housing member including a support surface mount and an opening to receive optical fibers from a line group and having formations which define a path for said fibers from said opening; and a second housing member, said fist housing member being connected to said second housing member, said second housing member having a splice region and formations which define a path which can receive said fibers from said first housing member and guide the fibers to said splice region, said second housing member having further formations which define further paths for fibers extending from said splice region to one or more outlets.

11. A housing according to claim 10, wherein said second housing member comprises two parts including a first part pivotally connected to said first housing member, said part being molded so as to define said one or more outlets, and said second part including a tray member which has said formations which define said paths.

12. A housing according to claim 11, wherein the splice region is defined in said tray member and is arranged to receive one or more splice units.

13. A housing according to claim 12, wherein each splice unit comprises a molded member which defines a number of side-by-side channels.

14. A housing according to claim 12, wherein the splice region also accommodates a breakout unit which, when used, is disposed below the splice unit.

15. A connection housing for an optical fiber, the housing comprising:

a first housing member including a support mount and defining an opening to receive the optical fiber, said first housing member including first housing formation which define an incoming housing path guiding the fiber from said opening; and a second housing member movably connected to said first housing member, said second housing member having a splice region and defining a fiber connector outlet, said second housing including second housing formations which define a first, second and third path, said first path guiding the fiber from said first housing and around an inside of said second housing said second path guiding the fiber from said first path, around said inside of said housing to said splice region, said second path being inside said first path, said third path guiding the fiber from said splice region around said inside of said second housing, said third path being inside said first path, said third path branching back to said second path and also branching to said fiber connector outlet.

16. A connection housing in accordance with claim 15, wherein:

said second housing member defines a plurality of fiber connector outlets;

said first and second housing formations guide a plurality of optical fibers.

17. A connection housing in accordance with claim 15, wherein:

said third path is arranged inside said path;

said splice region is arranged inside said first path.

18. A connection housing in accordance with claim 15, wherein:

said second path has a slack area.

19. A connection housing in accordance with claim 15, wherein:

said fiber connector outlet is arranged inside said third path.

20. A connection housing in accordance with claim 15, further comprising:

an optical fiber connector element arranged in said connector outlet;

an optical fiber connected to said connector element and extending along said third path to said splice region.

21. A connection housing in accordance with claim 15, further comprising:

a splice unit arranged in said splice region;

one of either another splice unit and a breakout unit also arrange in said splice region, said splice unit being stacked with said one of said another splice unit and said breakout unit in said splice region.

22. A connection accordance with claim 21, wherein:

said splice unit and said one of said another splice unit and said breakout unit have housing connectors for connecting to each other and to said second housing member.

23. A connection housing in accordance with claim 15, wherein:

said first housing member has a wall mount for mounting to a wall;

said second housing member is pivotally connected to first housing between a first position substantially parallel to the wall and a second position substantially perpendicular to the wall with an inside of the second housing member facing upward in said second position.

24. A connection housing in accordance with claim 22, wherein:

said first housing member has a wall mount for mounting to a wall;

said second housing member is pivotally connected to first housing between a first position substantially parallel to the wall and a second position substantially perpendicular to the wall with an inside of the second housing member facing upward;

said second housing member defines a plurality of connector outlets;

said first and second housing formations guide a plurality of optical fibers;

said third path is arranged inside second path;

said second path has a slack area;

said connector outlet is arranged inside said third path;

an optical fiber connector element is arranged in said connector outlet;

an optical fiber is connected to said connector element and extends along said third path to said splice region.

* * * * *

UNITED STATES PATENT AND TRADEMARK OFFICE
CERTIFICATE OF CORRECTION

PATENT NO. : 6,788,871 B2  Page 1 of 1
APPLICATION NO. : 10/381467
DATED : September 7, 2004
INVENTOR(S) : Taylor It is certified that error appears in the above-identified patent and that said Letters Patent is hereby corrected as shown below:

Col. 5, line 3, claim 15: "support mount" should read --support surface mount--

Col. 5, line 5, claim 15: "housing formation" should read --housing formations--

Col. 5, line 14, claim 15: "housing said second" should read --housing, said second--

Col. 6, line 9, claim 22: "connection accordance" should read --connection housing in accordance--

Col. 6, line 37, claim 24: "inside second path;" should read --inside said second path;--

Signed and Sealed this

Eighth Day of January, 2008

JON W. DUDAS
*Director of the United States Patent and Trademark Office*